(12) United States Patent
Thisius et al.

(10) Patent No.: US 11,912,415 B2
(45) Date of Patent: Feb. 27, 2024

(54) ROTATABLE INSERT FOR AIRCRAFT SEAT BASE

(71) Applicant: Textron Aviation Inc., Wichita, KS (US)

(72) Inventors: Todd Alan Thisius, Cheney, KS (US); Tim Todd Razey, Peck, KS (US)

(73) Assignee: Textron Innovations Inc., Providence, RI (US)

( * ) Notice: Subject to any disclaimer, the term of this patent is extended or adjusted under 35 U.S.C. 154(b) by 254 days.

(21) Appl. No.: 17/587,832

(22) Filed: Jan. 28, 2022

(65) Prior Publication Data

US 2022/0242577 A1 Aug. 4, 2022

Related U.S. Application Data

(60) Provisional application No. 63/143,160, filed on Jan. 29, 2021.

(51) Int. Cl.
| | | |
|---|---|---|
| *B64D 11/06* | (2006.01) | |
| *B60N 2/07* | (2006.01) | |
| *B60N 2/015* | (2006.01) | |
| *B60N 2/005* | (2006.01) | |

(52) U.S. Cl.
CPC .......... *B64D 11/0696* (2013.01); *B60N 2/005* (2013.01); *B60N 2/01516* (2013.01); *B60N 2/0715* (2013.01); *B60N 2/0722* (2013.01)

(58) Field of Classification Search
USPC .............. 280/86.75, 86.753, 86.754, 86.755
See application file for complete search history.

(56) References Cited

U.S. PATENT DOCUMENTS

| | | | | |
|---|---|---|---|---|
| 5,352,002 | A * | 10/1994 | Vouillon | H04N 5/65 348/E5.131 |
| 5,871,318 | A * | 2/1999 | Dixon | B60N 2/01558 410/104 |
| 6,086,018 | A | 7/2000 | Gobeil et al. | |
| 7,695,225 | B2 | 4/2010 | Pozzi | |
| 8,469,375 | B2 * | 6/2013 | Frens | B62D 17/00 280/86.753 |
| 8,602,702 | B2 * | 12/2013 | Roy | B60N 2/01525 244/118.6 |
| 2007/0232101 | A1 * | 10/2007 | Hudson | B64D 11/0696 439/157 |
| 2009/0302665 | A1 * | 12/2009 | Dowty | B61D 33/0057 296/1.03 |
| 2016/0059653 | A1 * | 3/2016 | Gan | F16B 43/00 74/567 |
| 2017/0015356 | A1 * | 1/2017 | Weifenbach | B62D 17/00 |
| 2018/0134182 | A1 * | 5/2018 | Hoshide | B60N 2/08 |

(Continued)

OTHER PUBLICATIONS

CarrLane Manufacturing, "Cam Clamps Guide," https://www.carrlane.com/engineering-resources/technical-information/manual-workholding/cam-clamps, 2020.

*Primary Examiner* — David E Allred
(74) *Attorney, Agent, or Firm* — Avek IP, LLC

(57) ABSTRACT

A vibration-reducing insert is usable to reduce vibration or play between two metal aircraft components. The insert rotates on a fastener, and includes a shelf that projects into the gap and operates as an indexable cam to establish an appropriate compression in an engaged portion of the shelf.

20 Claims, 8 Drawing Sheets

(56) References Cited

U.S. PATENT DOCUMENTS

| | | | |
|---|---|---|---|
| 2019/0144119 A1* | 5/2019 | Danet | F16B 2/02 |
| | | | 248/188.9 |
| 2019/0217938 A1* | 7/2019 | Cysewski | B64D 11/0696 |
| 2019/0291871 A1 | 9/2019 | Jacobson et al. | |
| 2019/0315472 A1* | 10/2019 | Wolgast | B64D 11/0696 |
| 2021/0170787 A1* | 6/2021 | Wharram | B60G 3/20 |

* cited by examiner

ROTATABLE INSERT FOR AIRCRAFT SEAT BASE

CROSS-REFERENCE TO RELATED APPLICATIONS

None.

BACKGROUND OF THE INVENTION

1. Field

The disclosed embodiments relate generally to the field of securement arrangements. More specifically, the embodiments relate to the field of fastening a seat base to a floor system in aircraft.

2. Description of the Related Art

None.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

Disclosed is a fastener system which, in embodiments, incorporates an indexed cam member.

In some aspects, the techniques described herein relate to a mounting system for a seat inside an aircraft, the aircraft having a first floor rail and a second floor rail, the first floor rail being spaced apart from the second floor rail, the mounting system including: a first mount configured to follow and be mounted onto the first rail, an upper surface on the first mount including one or more upwardly-extending lugs, the lugs defining apertures therethrough; a second mount being configured to follow and be mounted onto the second rail, an upper surface on the second mount including one or more upwardly-extending lugs, the lugs defining apertures therethrough; a seat base configured to be secured onto and above the first and second mounts, the seat base including one or more downwardly-extending flanges, the one or more flanges including one or more apertures being alignable with the one or more apertures in the one or more lugs such that one or more bolts can be received through the flange and lug to secure the first and second mounts to the seat base; each of the one or more bolts having a threaded end and a head, the head having a tool-receiving configuration; and one or more inserts, each insert having: an axially central bolt-receiving aperture; a head-receiving side having a head-securing recess, the recess being configured to receive and secure the tool-receiving configuration of each bolt, thus causing each insert to rotate with each bolt; an abutment side opposite the head-receiving side; an outer edge of the insert including a substantially-arcuate shelf extending out from the abutment side of the insert, the arcuate shelf being configured to be rotatable inside a gap established between a lower end of each of the one or more downwardly-extending flanges on the seat base and an upper surface adjacent to each of the one or more lugs on the first and second mounts; and the substantially-arcuate shelf having a plurality of variable thicknesses, each thickness in the plurality establishing a different compression level between the one or more lower ends of the flanges and the one on more upper surfaces adjacent to the flanges.

In some aspects, the techniques described herein relate to a mounting system wherein each of the one or more flanges are part of a clevis pair configured to sandwich each of the one or more lugs.

In some aspects, the techniques described herein relate to a mounting system wherein the first and second rail mounts are spaced apart and substantially parallel to one another.

In some aspects, the techniques described herein relate to a mounting system wherein each of the one or more inserts are constructed of a compressible material having a compressibility and a coefficient of friction configured to avoiding galling of engaged seat structures during use.

In some aspects, the techniques described herein relate to a mounting system wherein each of the one or more inserts are made of plastic.

In some aspects, the techniques described herein relate to a mounting system wherein the head-receiving recess is configured to only partially receive the bolt head leaving an exposed portion, the exposed portion enabling operation of the bolt by a tool.

In some aspects, the techniques described herein relate to a mounting system wherein each of the one or more bolt heads and each head-receiving recess have a hexagonal shape.

In some aspects, the techniques described herein relate to a mounting system wherein the substantially-arcuate shelf extending out from the abutment side of the insert functions as an indexed cam.

In some aspects, the techniques described herein relate to a mounting system wherein the substantially-arcuate shelf further includes: a plurality of consecutive radially-outcropped ramp faces, a first ramped face in the plurality being at a same angle relative to tangent as a second consecutive ramped surface in the plurality.

In some aspects, the techniques described herein relate to a mounting system wherein a first position of the first surface and a second position of the second surface establish two distinctive indexed levels of pressure created between a lower end of each of the one or more downwardly-extending flanges on the seat base and an upper surface adjacent to each of the one or more lugs on the first and second mounts.

In some aspects, the techniques described herein relate to a mounting system wherein an angle or the first surface and second surface taken relative to a tangent taken at a leading edge for the first and second surfaces are substantially the same.

In some aspects, the techniques described herein relate to a system for reducing vibration between a first aircraft component and a second aircraft component, the first and second components being connected using a fastener, the fastener having a head, the system including: an insert configured to receive and secure the fastener head such that the insert rotates with the fastener; a shelf extending outwardly from an edge of the insert, the shelf configured to be introduced into a gap created between a portion of the first component and a surface of the second component, the shelf also being outwardly ramped creating a plurality of thicknesses in a direction of rotation; and the system being further configured such that a rotation of the fastener head results in engagement of a portion of the ramp having a greater thickness selectively increasing a pressure in the portion.

In some aspects, the techniques described herein relate to a system wherein the first aircraft component is a flange and the second aircraft component is a lug.

In some aspects, the techniques described herein relate to a system wherein the first aircraft component and the second aircraft component are both made of metal.

In some aspects, the techniques described herein relate to a system wherein the shelf on the insert is made of a compressible material having a compressibility and a coefficient of friction configured to avoiding galling of the first and second aircraft components.

In some aspects, the techniques described herein relate to a system wherein the shelf on the insert is made of plastic.

In some aspects, the techniques described herein relate to a system wherein the insert is made entirely of plastic.

In some aspects, the techniques described herein relate to a system wherein: a first side of the insert includes a recess that is shaped to a shape of the fastener head to enable the insert to rotate with the fastener when the fastener is actuated.

In some aspects, the techniques described herein relate to a system wherein the recess is configured to only partially receive a bolt head leaving an exposed portion, the exposed portion enabling actuation of the bolt by a tool.

In some aspects, the techniques described herein relate to a system wherein the shelf includes a plurality of consecutive radially-outcropped ramp faces located at a plurality of different angular positions about a periphery of the insert, each ramped face, upon engagement inside the gap between the first and second components, resulting in an increase or decrease in compression to establish distinctive indexed compression levels based on a particular angular position of the insert.

BRIEF DESCRIPTION OF THE SEVERAL VIEWS OF THE DRAWINGS

Illustrative embodiments are described in detail below with reference to the attached drawing figures, which are incorporated by reference herein and wherein.

Figure 1:
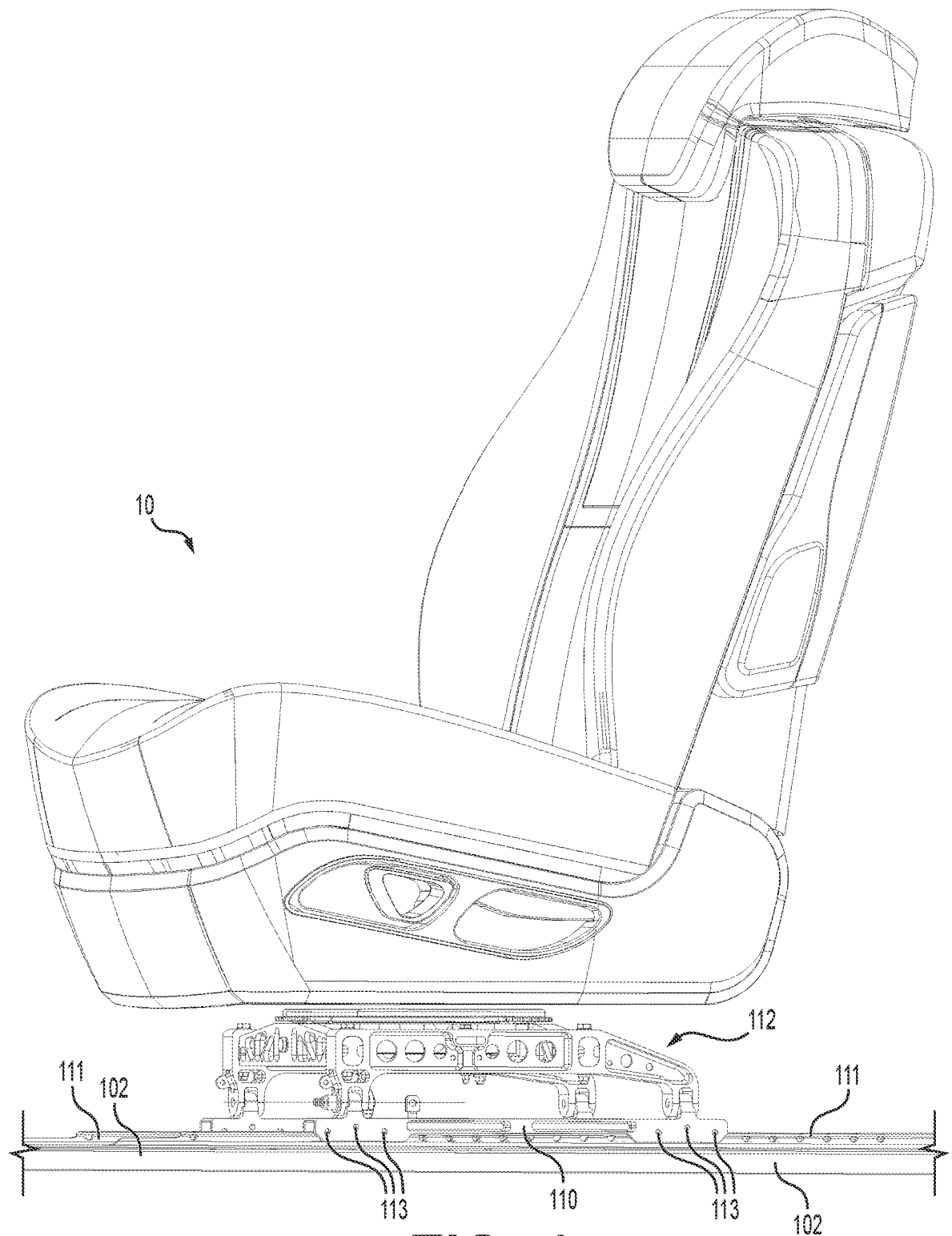
FIG. 1 is a perspective view showing an aircraft seat base system incorporating inserts used along with bolts used to secure a seat base to a floor rail arrangement.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced.

The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 2:
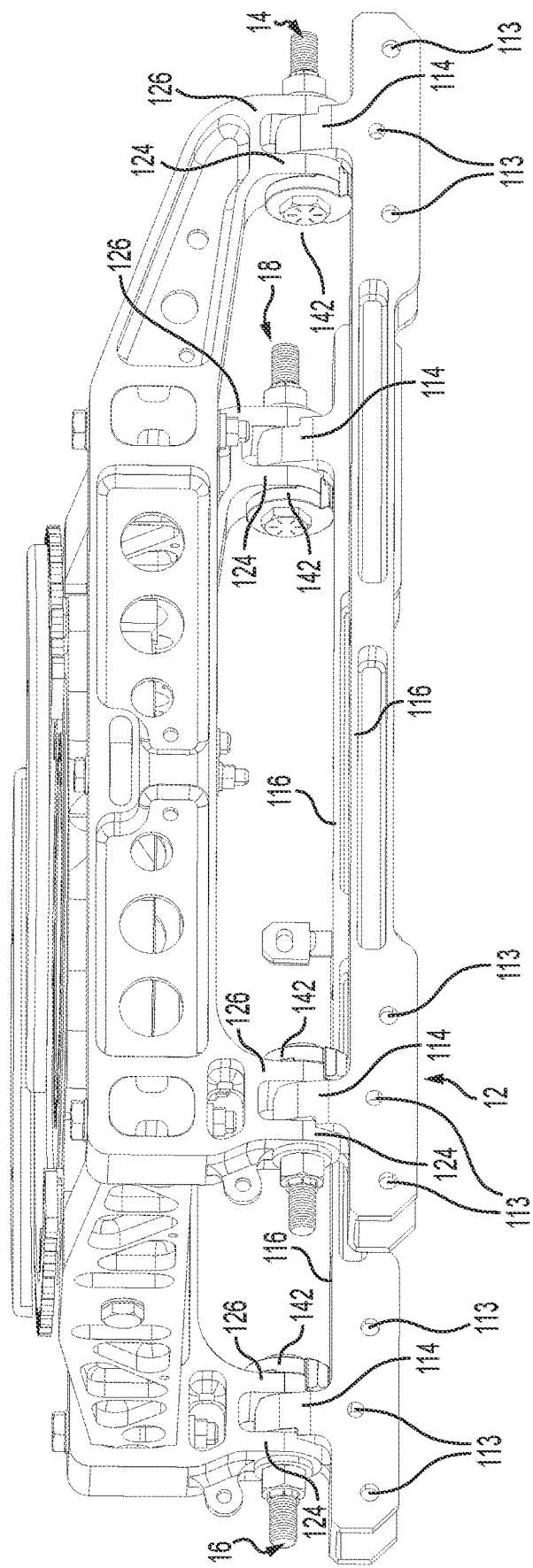
FIG. 2 is a more detailed view of the base and rail of the system shown in FIG. 1, but with the upper seat and seat back removed.

Embodiments provide systems and a method for securing one component to another. A system embodiment, as seen in FIG. 1, can be used to secure an aircraft seat 10 onto an aircraft floor 102 underneath and supporting the seat 10. In some conventional arrangements, and in the FIG. 1 embodiment, rails 111 exist on a floor (e.g., a vehicle interior floor, i.e., in aircraft) for the purpose of allowing for attachment of seats. In the disclosed embodiment, a pair of opposing substantially parallel rail mounts 110 which follow and are configured to be securable atop the rails 111 supporting the seat 10 in an upright position above the floor 102 as shown. As can be seen in FIGS. 1 and 2, the mounts 110 include apertures 113 which receive fasteners (not shown) which are used to connect the mounts 110 to the rails 111.

A seat base 112 is typically provided at the bottom of the seat and is mounted atop each of the substantially parallel mounts 110. As can be seen in FIG. 2, four upwardly-extending lugs 114 are formed atop upper surfaces 116 of each seat rail mount 110, and used to secure lower portions of the seat base 112 at each of four corner positions for the chair, including front left 12, rear left 14, front right 16, and rear right 18 corner positions. Each lug 114, in embodiments, extends up from the upper surfaces 116 of each of the two rails 110. The lugs 114 are transversely oriented relative to the direction in which the rail 110 extends. Each lug 114 also includes a bore 119 formed therethrough which has a center axis in line with the rail-following mount 110, and is crosswise through the lug body 114. The lug bores 119 are used for fastening the lugs 114 to the seat base 112 using bolts.

The seat base 112 includes corresponding structures enabling a connection to be made between the mounts 110 and the base 112. More specifically, at each of the four corner positions 12, 14, 16, and 18, a clevis 120 extends down from the seat frame 112 to make a connection with each corresponding lug 114. A broken out view of FIG. 3

Figure 4:
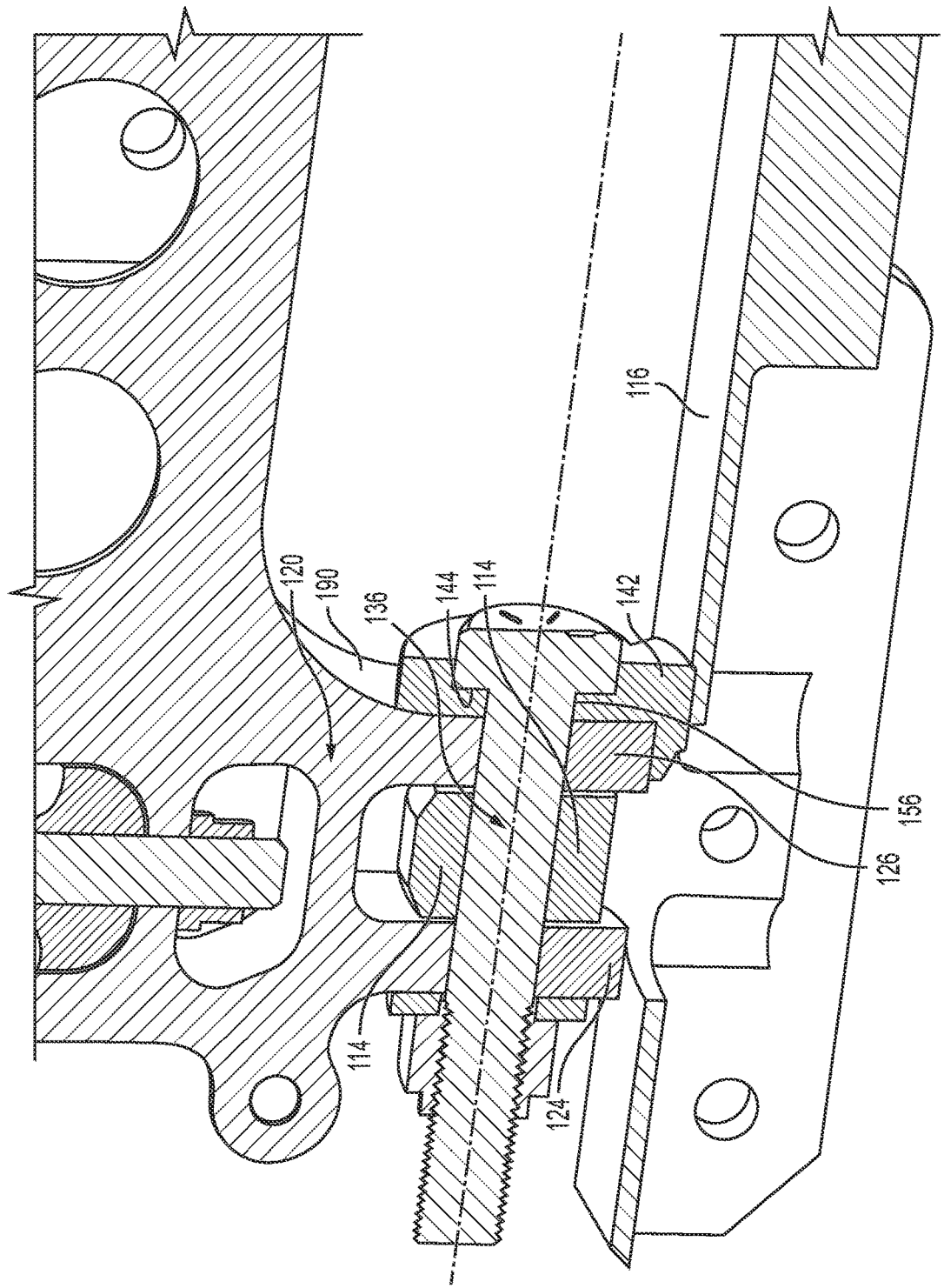
FIG. 4 is a sectional view of the bolt and other components of the fastener arrangement shown in FIG. 3.

(showing the front right clevis/lug connection), along with the cross sectional of FIG. 4 show this arrangement more clearly. Each of the four devises 120 has spaced-apart rear and forward downwardly-extending flanges 124 and 126, the flanges being substantially parallel relative to one another. Each of the downwardly-extending flanges 124 and 126 has a transverse bore made therethrough (e.g., comprised of aligned bores 128 and 130 in the exploded view of FIG. 5). Apertures 128 and 130 are configured into flanges 124 and 126 such that when the lug 114 is received into a space 132 (which is defined into the area by which flanges 124 and 126 are spaced apart), they align with the bore 119 traveling through lug 114 (FIG. 5 shows before insertion, and FIG. 6 after insertion), thus enabling a fastener 136, e.g., a bolt, when the bores are aligned as shown in FIG. 6, to be received through both flanges 124 and 126 and the lug 114, and thus securement made between the clevis 120 and rail lug 114 at each of the four corner positions 12, 14, 16, and 18.

Fastener (bolt) 136, in embodiments, includes a threaded end portion 138 which transitions into a smooth shaft 139 lengthwise before reaching a hexagonal head 140. The threaded end 138, after the bolt is installed through the passageway defined by the three apertures, will receive a spring/lock washer 141 and then a nut 143, which can be fastened to the threaded end 138 with corresponding internal threads.

Rotatable Insert 142

Figure 5:
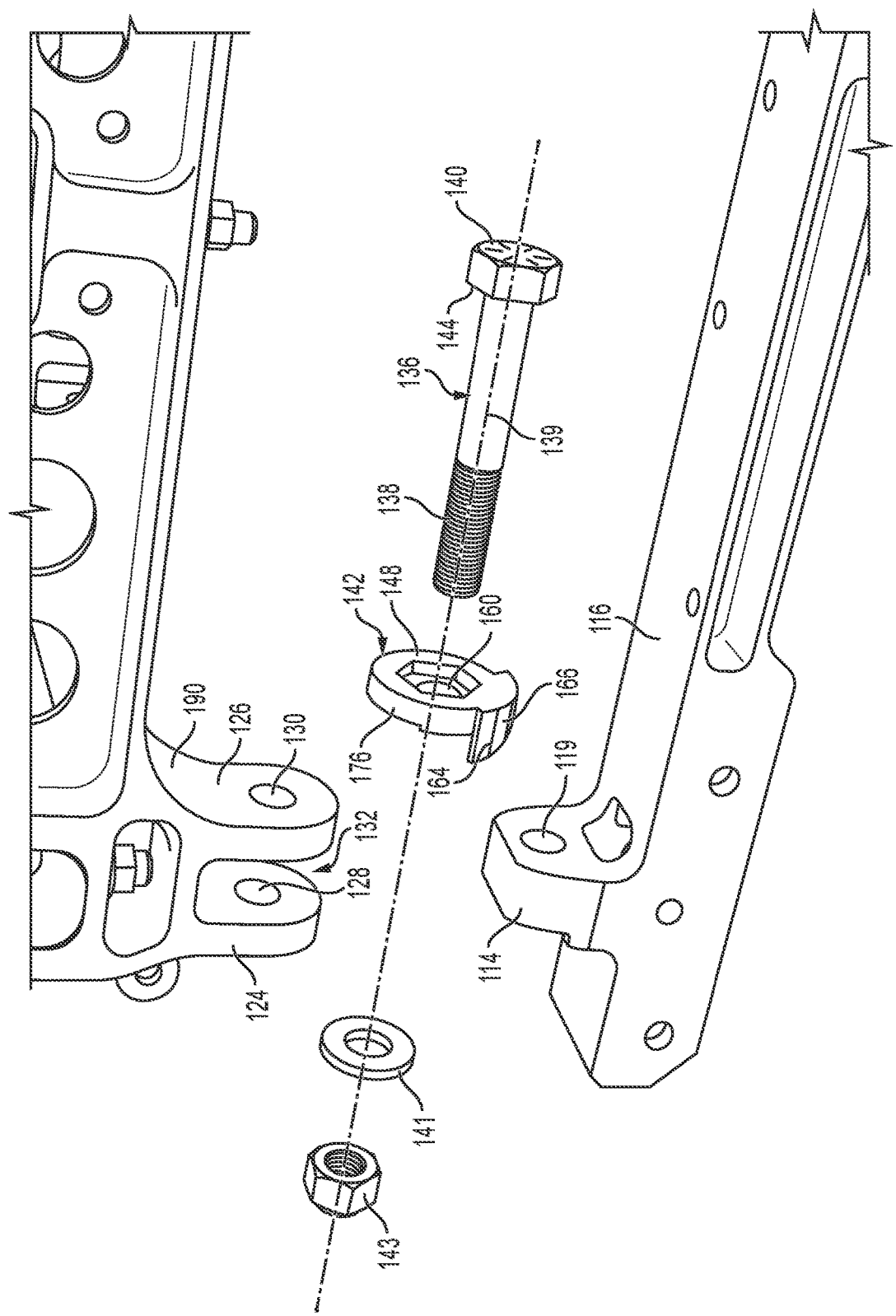
FIG. 5 is an exploded view of the fastener arrangement before the seat base clevis and rail lug have been aligned.
Figure 6:
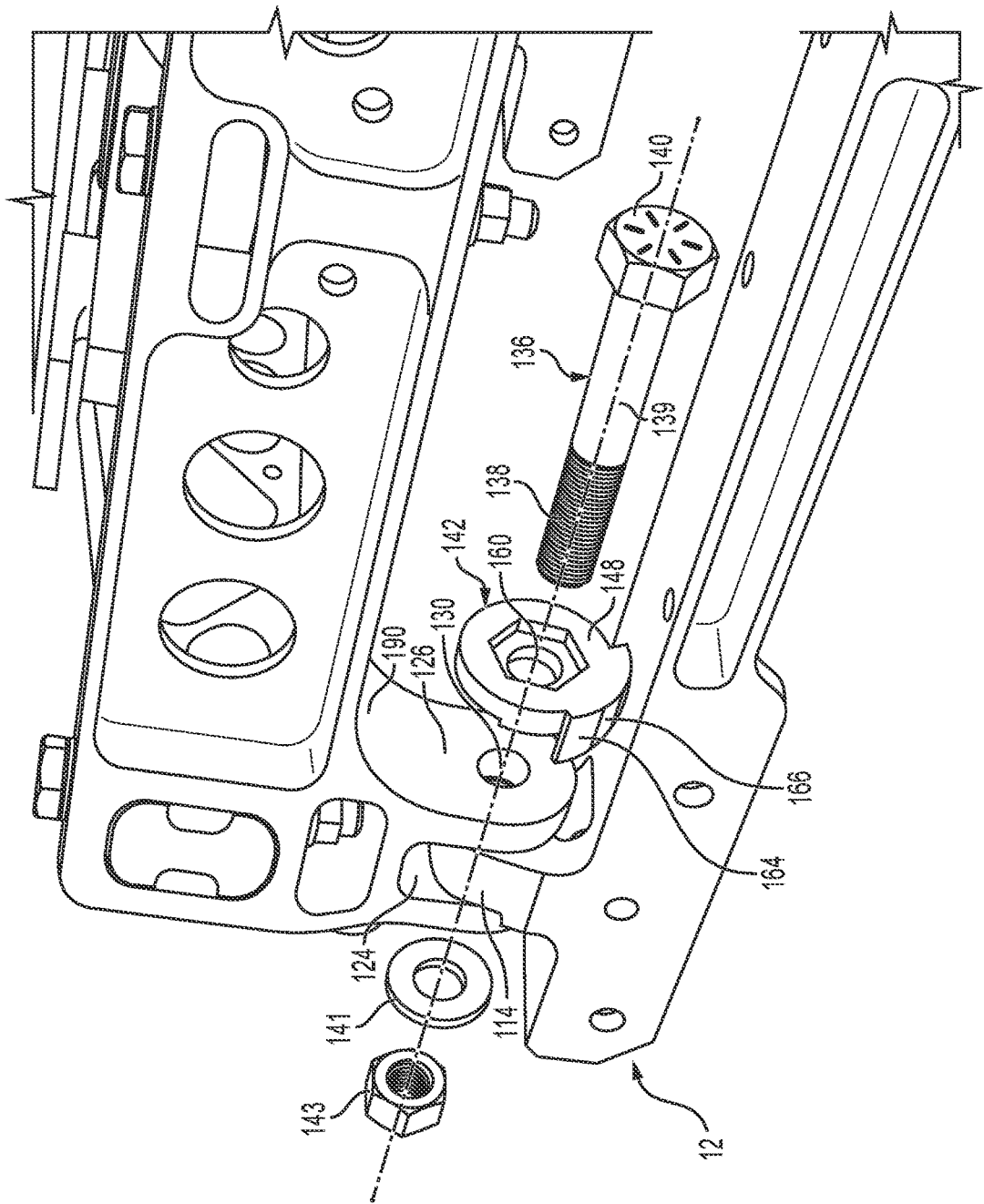
FIG. 6 is an exploded view of the fastener arrangement after the seat base clevis and rail lug have been aligned, but before installation of the bolt.

A rotatable insert 142 is incorporated into the system as shown in the exploded views of FIGS. 5 and 6. In embodiments, rotatable insert 142 is fabricated using 3-D printing, injection molding, or some other process. In terms of composition, the insert 142 can be made of a plastic in embodiments. For example, Ultem™ or other like materials might be used to construct the insert 142 in embodiments. Regardless of composition, since aircraft seat base rails and base components are normally constructed of Aluminum, the material selected to comprise the insert 142 should be one having sufficient compressibility and a coefficient of friction ideal for avoiding galling of the Aluminum rail or seat structures. The moderated elasticity along with a coefficient of friction should also, while enabling a firm connection, allowing for proper rotation, while providing some compressibility to enhance indexing of increasing pressure levels which will be discussed hereinafter.

In terms of the system presented in FIGS. 1-6, the rotatable insert 142 is installed between an engagement face 144 of the head 140, and the outside surface 146 of one of the two flanges (flanges 124 or 126) as can be seen in FIGS. 5 and 6. The rotatable insert 142 functions as an indexed cam. Those skilled in the art will recognize that the bolt could be installed in the opposite direction through apertures 119, 128 and 130 instead of the orientation shown in FIGS. 5 and 6 and work in a substantially similar fashion, thus the scope of embodiments should not be limited to any depicted orientation unless otherwise recited in the claims.

The details of the insert 142 are shown in FIGS. 7A, 7B, 7C, and 7D wherein the component is isolated. As can be seen, the insert 142 includes a fastener-head-receiving side 148 and a flange-abutment side 150. Fastener-head-receiving side 148 includes a head-securing recess 152. Head securing recess 152 is configured to receive a profile shape of the head, which is hexagonal in the disclosed embodiment. Thus, recess 152, in the disclosed embodiment, includes six internal side faces 154. The head 140 is secured into in the recess 152 to an extent, but not completely (see FIG. 4 cross section). Thus, at least a portion 156 of the head 140 is exposed, and a second portion 158 is embedded. The embedded portion 158 of the head 140, in embodiments, can comprise about 50% or the total head thickness, thus leaving about 50% of the head exposed. The exposed portion 156 enables tool reception for either activating rotation or preventing rotation of the bolt in the apertures upon a wrench or other device turning the head 140 while securing the nut 143 with another tool (e.g., a second wrench). Since the leading portion of the head 140 is secured in the correspondingly shaped receiving hexagonal recess 152, the insert 142 rotates along with the bolt 136. This enables actuation by rotation of the indexing features used to secure the seat base 112 firmly to the rail 110 in a manner in which there is no rattle.

Looking further at the isolation images of FIGS. 7A-D, a center aperture 160 can be seen. Center aperture 160 is sized to allow for passage of the bolt 136 therethrough. Looking at the details of fastener-head-receiving side 148, a hexagonal recess 152 (see FIG. 7A) is defined into a substantially flat face 151 at a depth until encountering a wall 161 through which the center aperture 160 is made.

The flange-abutment side 150 (see FIG. 7B) of the insert 142 includes a substantially flat portion 174 which will compress against the flange 126 (see FIG. 6) on installation. The lower portions of the insert 142 on the abutment side 150 are substantially cylindrical, but an upper portion includes an outer radially-removed edge leaving an angled face 176 about the upper cylindrical periphery. Angled face 176 terminates at each end with opposing triangular end walls 178 and 180. End walls 178 and 180 will act as stops against rotation when they encounter the angled edges 177 and 179 on each side of clevis flange 126. The recession away from a truly cylindrical edge created by angled face 176 allows the insert to rotate freely even in view of an outwardly-curved surface 190 of the downwardly-extending clevis flange 126 (see FIGS. 5-6 and 7B) by avoiding interference.

Figure 7A:
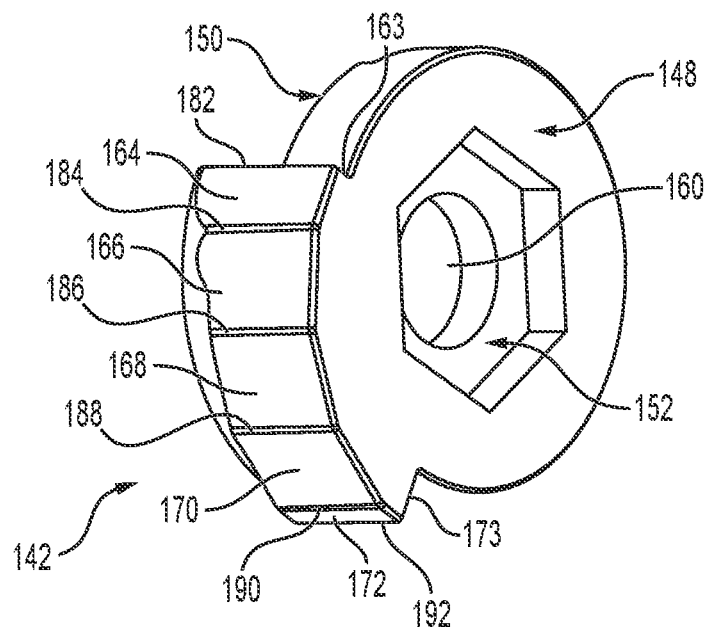
FIG. 7A is an isolated view of the insert shown from a first perspective.
Figure 7B:
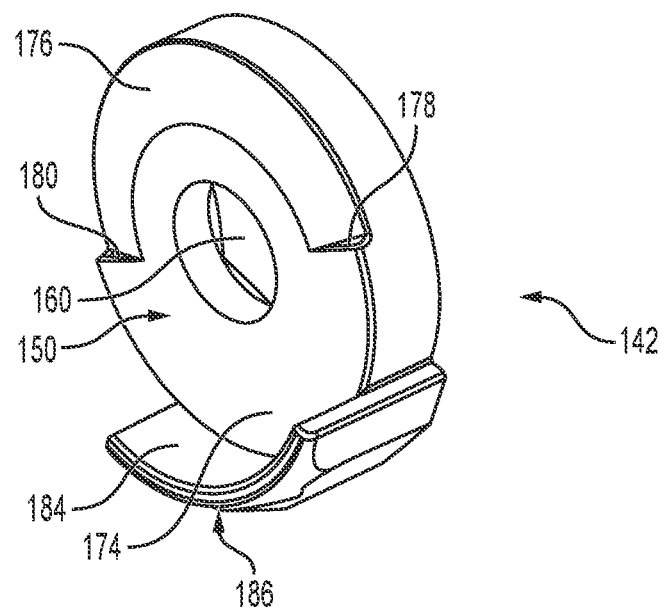
FIG. 7B is an isolated view of the insert shown from a second perspective.
Figure 7C:
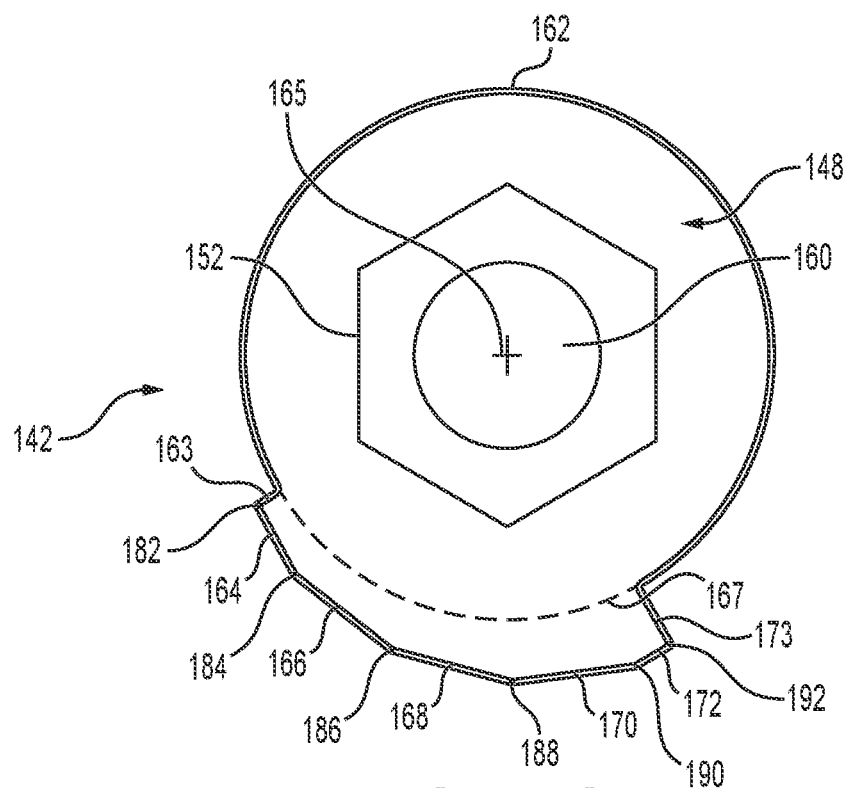
FIG. 7C is a fastener-head-receiving side view of the insert.
Figure 7D:
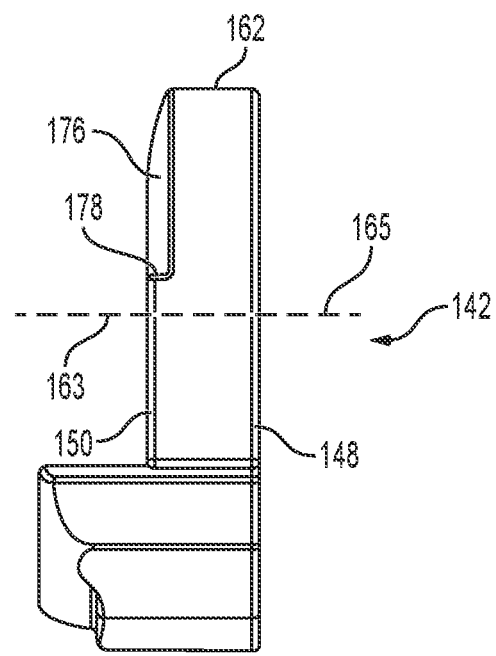
FIG. 7D is a front view of the insert.

The insert 142 includes a substantially cylindrical exterior portion 162 having a substantially constant radius from an insert center axis 165 (see FIGS. 7C and 7D). Another portion of the insert 142, however, is outcropped and has a plurality of ramped portions, including a first ramp face 164, a second ramped face 166, a third ramped face 168, and a fourth ramped face 170. In the disclosed embodiment, an initial riser face 163 elevates directly upward from the cylindrical portion 162 to an initial edge 182 of the first ramp face 164, and a drop off 173 is created at a rearmost edge 192 of the fourth ramp face 170, in the disclosed embodiment, extending down vertically to cylindrical portion 162. In the disclosed embodiment, each ramped portion has a surface that is equally angled relative to tangent as it rises from its front edge to the rear. A base line 167 is shown in FIG. 7C to show the features of the insert 142 extending outside the radius of the cylindrical portion 162. These features are used to create indexed levels of pressure against the rail to reduce vibration or squeaking that would otherwise be created between the clevis 120, bolt 136, and lug 114.

The system insert 142 eliminates squeaking that is due to metal-on-metal relative movements by interposing itself between the bolt head 140, a small portion 157 of the smooth portion of the bolt near the head 140, the flange 126 of the clevis 120, and the upper rail surface 116. The first, relatively small, ramp face 164, which extends from leading edge 182 and ends at edge 184 on the insert 142 is made to be at a slight angle radially outward relative to a tangent plane taken at base line 167 (which is circular relative to the outer cylindrical surface 162 of the cylindrical portion 162 of the insert) directly underneath the face in FIG. 7C. In embodiments, this angle is between greater than zero degrees, and 45 degrees relative to a tangent plane taken at the leading edge 182 relative to center axis 165. In more specific embodiments, this angle might be in the range of 11.25 to 33.75 degrees. In even more specific embodiments, this angle is about 22.5 degrees relative to the tangent plane taken at leading edge 182.

A second relatively larger ramp face 166 begins at edge 184 and ends at an edge 186. Like with the face before it (face 164), second face 166 is angled similarly relative to edge 184. More specifically, in embodiments, it is at an angle greater than 0 degrees and less than 45 degrees relative to a tangent plane taken at leading edge 184 relative to center axis 165. In more specific embodiments, the angle for face 166 might be in the range of 11.25 to 33.75 degrees. In even more specific embodiments, this angle is about 22.5 degrees relative to the tangent plane taken at leading edge 184.

Third relatively large ramp face 168, which begins at edge 186 and ends at edge 188, is also angled in manner similar to the angling of the faces before it. More specifically, it is at an angle greater than 0 degrees and less than 45 degrees relative to a tangent plane taken at edge 186 relative to center axis 165. In more specific embodiments, the angle for face 168 might be in the range of 11.25 to 33.75 degrees. In even more specific embodiments, this angle is about 22.5 degrees relative to the tangent plane taken at leading edge 186.

A fourth relatively large ramp face 170 which begins at edge 188 and ends at edge 190, is also angled in manner similar to the angling of the faces before it. More specifically, it is at an angle greater than 0 degrees and less than 45 degrees relative to a tangent plane taken at edge 188 relative to center axis 165. In more specific embodiments, the angle for face 170 might be in the range of 11.25 to 33.75 degrees. In even more specific embodiments, this angle is about 22.5 degrees relative to the tangent plane taken at leading edge 188.

A fifth relatively smaller ramped face 172 begins at edge 190 and ends at edge 192. This face 172 is also angled in manner similar to the faces before it. More specifically, it is at an angle greater than 0 degrees and less than 45 degrees relative to a tangent plane taken at edge 190 relative to center axis 165. In more specific embodiments, the angle for face 172 might be in the range of 11.25 to 33.75 degrees. In even more specific embodiments, this angle is about 22.5 degrees relative to the tangent plane taken at leading edge 190.

Thus, each of the planes defined by ramped surfaces 164, 166, 168, 170, and 172 are, in embodiments, at about the same angle relative to the tangent plane taken from the center axis 165 at the leading edge for each. This enables a gradual increase in effective diameter as the insert 142 is turned in a clockwise direction (relative to FIG. 7C) in a step by step function, each ramped surface thus gradually increasing pressure.

In alternative embodiments, it is possible that instead of a stepped cam arrangement enabling an indexed approach, a more common cam arrangement could be used wherein a portion of the insert 142 is radially enlarged as the insert rotates.

In operation of the disclosed system, a user first orients all four fastener systems at each of corners 12, 14, 16, and 18 are installed after aligning the holes through each of the four clevis flange pairs 124 and 126 with the holes 119 existing through each of lugs 114 (as shown in detail for corner 12 in FIGS. 5 and 6). Then, at each corner, the bolt 136 is installed through the insert aperture 160 with the bolt head 140 oriented on the receiving side 148 and then received into the hexagonal recess 152. Next, with the threaded end 138 of the bolt 136 exposed on the other side of the connection, the washer 141 is slid on, and then the nut 143 tightened to an extent on to the bolt. Nut 143 is initially tightened until the point that the abutment surface 150 first encounters the outer surface of the flange 126, but is rotatable enough that the insert 142 can be in a position where the first ramp surface 164 is resting atop the upper surface 116 of the rail 110 to establish a starting point for indexed pressure created by the insert 142. Also in this starting position, the upper engagement surface 194 (see FIG. 7B) of an outcropped intermediating portion 196 outside which the ramps are defined will support and press up against the bottom of the flange 126 from below (see FIG. 4).

Figure 3:
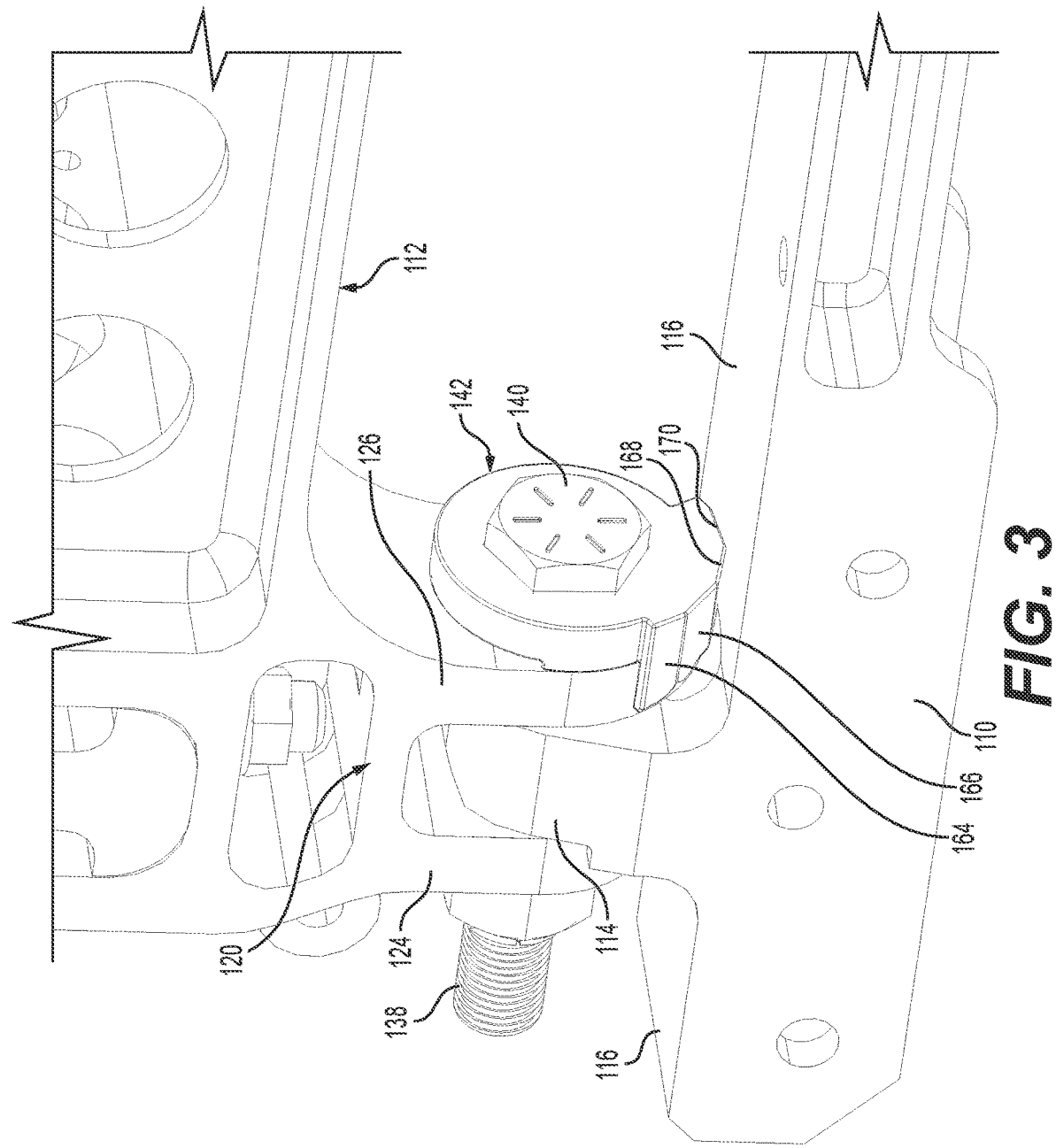
FIG. 3 is a perspective view showing one of the four seat base to rail fastener arrangements wherein an indexed cam insert can be seen as it appears after installation.

To begin indexing, opposing nut 143 is secured within a tool against rotation. At the same time, the bolt head 140 is turned (clockwise in the disclosed embodiment) slowly with a wrench or other tool. As this occurs, the insert 142 will rotate with the bolt head 140 such that the rail upper surface 116 is encountered sequentially by the ramped surfaces 164, 166, 168, 170, and then 172. The subtlety of the angles relative to tangent is able to gradually and selectively increase the pressure between the insert 142, clevis flange 126, bolt head 140, bolt portion 157, and the upper surface 116 of the rail upon turning of the bolt (assuming that the nut is secured). More specifically, by turning the bolt (using a wrench) initially to a point that first ramped surface 164 is encountered by the rail upper surface (wedged). Further turning of the bolt in a clockwise direction results in the second, third, fourth, and fifth ramped surfaces 166, 168, 170 and 172 (to the extend movement is allowed) engaging the rail surface. As a result, the pressure of the insert 142 increases to a desired level. The ultimate position is shown in FIGS. 3 and 4. The indexing upward in pressure based on the angular (clocked) position of the insert 142 may involve, in embodiments, an indexing through the five different ramped surfaces until one position is sufficient to lock the insert tightly in place. The rotation of the bolt to reach an ultimate angular position on one of the five ramped surfaces, in embodiments, can accommodate sizing imperfections or enable a variety of applications for the same insert. In other words, tolerances for differently sized components can be anticipated, and accommodated by the different ramped levels. In these embodiments, the tightness established as a function of rotation of the bolt head 140 can be a matter of feel. In other embodiments, the insert 142 is configured to create the desired pressure levels once rotation has occurred to a clocked position such that the last ramped surface 172 is atop the rail top surface 116 (as seen in FIGS. 3 and 4) by design. In other words, the insert 142 and ramps 162, 166, 168, 170, and 172 can either be specifically configured for particular environmental specifications (e.g., where relative distances between components are known) or for more general applications where the insert 142 can be used to accommodate a variety of numerous mechanical connection arrangements.

Many different arrangements of the various components depicted, as well as components not shown, are possible without departing from the spirit and scope of what is claimed herein. Embodiments have been described with the intent to be illustrative rather than restrictive. Alternative embodiments will become apparent to those skilled in the art that do not depart from what is disclosed. A skilled artisan may develop alternative means of implementing the aforementioned improvements without departing from what is claimed.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A mounting system for a seat inside an aircraft, the aircraft having a first floor rail and a second floor rail, the first floor rail being spaced apart from the second floor rail, the mounting system comprising:
- a first mount configured to follow and be mounted onto the first rail, an upper surface on the first mount including one or more upwardly-extending lugs, the lugs defining apertures therethrough;
- a second mount being configured to follow and be mounted onto the second rail, an upper surface on the second mount including one or more upwardly-extending lugs, the lugs defining apertures therethrough;
- a seat base configured to be secured onto and above the first and second mounts, the seat base including one or more downwardly-extending flanges, the one or more flanges including one or more apertures being alignable with the one or more apertures in the one or more lugs such that one or more bolts can be received through the flange and lug to secure the first and second mounts to the seat base;
- each of the one or more bolts having a threaded end and a head, the head having a tool-receiving configuration; and
- one or more inserts, each insert having:
- an axially central bolt-receiving aperture;
- a head-receiving side having a head-securing recess, the recess being configured to receive and secure the tool-receiving configuration of each bolt, thus causing each insert to rotate with each bolt;
- an abutment side opposite the head-receiving side;
- an outer edge of the insert comprising a substantially-arcuate shelf extending out from the abutment side of the insert, the arcuate shelf being configured to be rotatable inside a gap established between a lower end of each of the one or more downwardly-extending flanges on the seat base and an upper surface adjacent to each of the one or more lugs on the first and second mounts; and
- the substantially-arcuate shelf having a plurality of varying thicknesses, each thickness in the plurality establishing a different compression level between the one or more lower ends of the flanges and the one on more upper surfaces adjacent to the flanges.

2. The mounting system of claim 1 wherein each of the one or more flanges are part of a clevis pair configured to sandwich each of the one or more lugs.

3. The mounting system of claim 1 wherein the first and second rail mounts are spaced apart and substantially parallel to one another.

4. The mounting system of claim 1 wherein each of the one or more inserts are constructed of a compressible material having a compressibility and a coefficient of friction configured to avoiding galling of engaged seat structures during use.

5. The mounting system of claim 4 wherein each of the one or more inserts are made of plastic.

6. The mounting system of claim 1 wherein the head-receiving recess is configured to only partially receive the bolt head leaving an exposed portion, the exposed portion enabling operation of the bolt by a tool.

7. The mounting system of claim 1 wherein each of the one or more bolt heads and each head-receiving recess have a hexagonal shape.

8. The mounting system of claim 1 wherein the substantially-arcuate shelf extending out from the abutment side of the insert functions as an indexed cam.

9. The mounting system of claim 1 wherein the substantially-arcuate shelf further comprises:
- a plurality of consecutive radially-outcropped ramp faces, a first ramped face in the plurality being at a same angle relative to tangent as a second consecutive ramped surface in the plurality.

10. The mounting system of claim 9 wherein a first position of the first surface and a second position of the second surface establish two distinctive indexed levels of pressure created between a lower end of each of the one or more downwardly-extending flanges on the seat base and an upper surface adjacent to each of the one or more lugs on the first and second mounts.

11. The mounting system of claim 10 wherein an angle or the first surface and second surface taken relative to a tangent taken at a leading edge for the first and second surfaces are substantially the same.

12. A system for reducing vibration between a first aircraft component and a second aircraft component, the first and second components being connected using a fastener, the fastener having a head, the system comprising:
- an insert configured to receive and secure the fastener head such that the insert rotates with the fastener;
- a shelf extending outwardly from an edge of the insert, the shelf configured to be introduced into a gap created between a portion of the first component and a surface of the second component, the shelf also being outwardly ramped creating a plurality of thicknesses in a direction of rotation; and
- the system being further configured such that a rotation of the fastener head results in engagement of a portion of the ramp having a greater thickness selectively increasing a pressure in the portion.

13. The system of claim 12 wherein the first aircraft component is a flange and the second aircraft component is a lug.

14. The system of claim 12 wherein the first aircraft component and the second aircraft component are both made of metal.

15. The system of claim 14 wherein the shelf on the insert is made of a compressible material having a compressibility and a coefficient of friction configured to avoiding galling of the first and second aircraft components.

16. The system of claim 15 wherein the shelf on the insert is made of plastic.

17. The system of claim 16 wherein the insert is made entirely of plastic.

18. The system of claim 12 wherein:
- a first side of the insert includes a recess that is shaped to a shape of the fastener head to enable the insert to rotate with the fastener when the fastener is actuated.

19. The system of claim 18 wherein the recess is configured to only partially receive a bolt head leaving an exposed portion, the exposed portion enabling actuation of the bolt by a tool.

20. The system of claim 12 wherein the shelf includes a plurality of consecutive radially-outcropped ramp faces located at a plurality of different angular positions about a periphery of the insert, each ramped face, upon engagement inside the gap between the first and second components, resulting in an increase or decrease in compression to establish distinctive indexed compression levels based on a particular angular position of the insert.

* * * * *